(12) United States Patent
Jayasena et al.

(10) Patent No.: US 10,817,422 B2
(45) Date of Patent: Oct. 27, 2020

(54) DATA PROCESSING SYSTEM WITH DECOUPLED DATA OPERATIONS

(71) Applicant: Advanced Micro Devices, Inc., Santa Clara, CA (US)

(72) Inventors: Nuwan Jayasena, Cupertino, CA (US); Amin Farmahini Farahani, Santa Clara, CA (US); Michael Ignatowski, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/104,567

(22) Filed: Aug. 17, 2018

(65) Prior Publication Data

US 2020/0057717 A1 Feb. 20, 2020

(51) Int. Cl.
*G06F 13/00* (2006.01)
*G06F 12/0804* (2016.01)
*G06F 12/0862* (2016.01)
*G06F 13/16* (2006.01)

(52) U.S. Cl.
CPC ...... *G06F 12/0804* (2013.01); *G06F 12/0862* (2013.01); *G06F 13/1668* (2013.01); *G06F 2212/1016* (2013.01); *G06F 2212/602* (2013.01)

(58) Field of Classification Search
CPC .. G06F 3/0605; G06F 3/0611; G06F 9/44557; G06F 15/7821; H01L 23/3128
See application file for complete search history.

(56) References Cited

U.S. PATENT DOCUMENTS

| 6,202,130 B1 | 3/2001 | Scales, III et al. | |
| 8,930,647 B1* | 1/2015 | Smith | G06F 9/44557 |
| | | | 711/154 |
| 9,966,278 B1* | 5/2018 | Kim | H01L 23/3128 |
| 2006/0271739 A1* | 11/2006 | Tsai | G06F 3/0611 |
| | | | 711/123 |
| 2014/0143491 A1* | 5/2014 | Kim | G06F 12/0802 |
| | | | 711/118 |
| 2014/0181415 A1 | 6/2014 | Loh et al. | |

(Continued)

OTHER PUBLICATIONS

Jaekyu Lee, Hyesoon Kim, Richard Vuduc; "When Prefetching Works, When It Doesn't, and Why"; ACM Transactions on Architecture and Code Optimization; vol. 9; No. 1; Article 2; Mar. 2012; 29 pages.

(Continued)

*Primary Examiner* — Ryan Bertram
*Assistant Examiner* — Trang K Ta
(74) *Attorney, Agent, or Firm* — Polansky & Associates, P.L.L.C.; Paul J. Polansky (57) ABSTRACT

In one form, a data processing system includes a host integrated circuit having a memory controller, a memory bus coupled to the memory controller, and a memory module. The memory module includes a bulk memory and a memory module scratchpad coupled to the bulk memory, wherein the memory module scratchpad has a lower access overhead than the bulk memory. The memory controller selectively provides predetermined commands over the memory bus to cause the memory module to copy data between the bulk memory and the memory module scratchpad without conducting data on the memory bus in response to a data movement decision.

34 Claims, 7 Drawing Sheets

(56) References Cited

U.S. PATENT DOCUMENTS

| | | | |
|---|---|---|---|
| 2014/0281243 A1* | 9/2014 | Shalf | G06F 12/0842 |
| | | | 711/122 |
| 2017/0123987 A1* | 5/2017 | Cheng | G06F 15/7821 |
| 2017/0168727 A1* | 6/2017 | Alavoine | G06F 3/0611 |
| 2017/0255390 A1* | 9/2017 | Chang | G06F 3/0605 |
| 2017/0293560 A1 | 10/2017 | Eckert et al. | |
| 2017/0344480 A1* | 11/2017 | Beard | G06F 12/08 |
| 2018/0109452 A1* | 4/2018 | Sebexen | H04L 49/109 |

OTHER PUBLICATIONS

Sparsh Mittal; A Survey of Recent Prefetching Techniques for Processor Caches; ACM Computing Surveys; vol. 49 ; No. 2; Article 35; Aug. 2016; 36 pages.

Motorola, Inc.; MC68302 Integrated Multiprotocol Processor; User's Manual, 1995 Edition; 120 pages.

Babak Falsafi, Thomas F. Wenisch; "A Primer on Hardware Prefetching"; Synthesis Lectures on Computer Architecture; No. 28; Published by Morgan & Claypool Publishers; May 2014; 11 pages.

\* cited by examiner

DATA PROCESSING SYSTEM WITH DECOUPLED DATA OPERATIONS

BACKGROUND

Computer systems generally include a central processing unit (CPU), memory, and input/output devices. In modern data processing systems, a set of memory accessing agents such as CPU cores, graphics processing units (GPUs), and the like can all generate access requests to the same memory system. Moreover modern computer bulk memory such as dynamic random access memory (DRAM) and flash memory is inexpensive and has high density, but suffers from longer access times than other memory types such as static random access memory (SRAM). The result is that in many computer systems, performance is limited by the speed and efficiency of operations that use the memory bus.

In an effort to improve the efficiency of accesses that use the memory bus, modern data processors typically include memory controllers that intelligently re-order memory accesses conducted over the memory bus to improve efficiency. For example, a memory controller may schedule a newer access to an open page in a DRAM before scheduling an older access to a different page to the DRAM to avoid the extra overhead of closing the open page, performing the older access, and re-opening this page. While there are many known strategies to balance fairness and efficiency of memory access requests, the main problem of inefficiency due to the use of these types of bulk memory devices remains.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

As will be described in detail below, in one form, a data processing system includes a host integrated circuit having a memory controller, a memory bus coupled to the memory controller, and a memory module. The memory module includes a bulk memory and a memory module scratchpad coupled to the bulk memory, wherein the memory module scratchpad has a lower access overhead than the bulk memory. The memory controller selectively provides predetermined commands over the memory bus to cause the memory module to copy data between the bulk memory and the memory module scratchpad without conducting data on the memory bus in response to a data movement decision.

In another form, a data processing system has a host integrated circuit. The host integrated circuit includes a memory accessing agent and a memory controller. The memory accessing agent generates memory access requests. The memory controller is coupled to the memory accessing agent and has an interface for connection to a memory bus. In response to a memory access request from the memory accessing agent, the memory controller provides one of a first set of commands for accessing data selectively from one of a bulk memory and a memory module scratchpad coupled to the bulk memory. In response to a data movement decision, the memory controller provides one of a second set of commands for transferring data between the bulk memory and the memory module scratchpad, wherein first set of commands is different from the second set of commands.

In yet another form, a data processing system includes a memory module. The memory module includes a base die, a plurality of bulk memory dies, and a memory channel. The base die has an external interface and a memory module scratchpad coupled to the external interface. The memory channel is coupled to the base die and to each of the plurality of bulk memory dies. In response to a first predetermined command, the base die conducts data between the external interface and a selected one of the plurality of bulk memory dies and the memory module scratchpad. In response to a second predetermined command, the memory module copies data between at least one of the plurality of bulk memory dies and the memory module scratchpad over the memory channel.

In still another form, a method is suitable for use in a data processing system having a host integrated circuit, a memory bus, and a memory module coupled to the host integrated circuit over the memory bus and having a bulk memory. A memory module scratchpad is coupled to the bulk memory in the memory module. A data movement decision is selectively made by the host integrated circuit for a data element in the memory module. A copy command is issued to the memory module over the memory bus to copy the data element between the bulk memory to the memory module scratchpad in response to making the data movement decision.

In yet another form a method is suitable for use in a data processing system having a host integrated circuit, a memory bus, and a memory module coupled to the host integrated circuit over the memory bus and having a bulk memory. A memory module scratchpad is coupled to the bulk memory in the memory module. A memory access request is received for a data element. A memory module scratchpad tracking table is accessed to determine whether the memory module scratchpad stores the data element. If the memory module scratchpad stores the data element, a first command is issued to the memory module scratchpad to complete the memory access request. If the memory module scratchpad does not store the data element, a second command is issued to the bulk memory to complete the memory access request.

Figure 1:
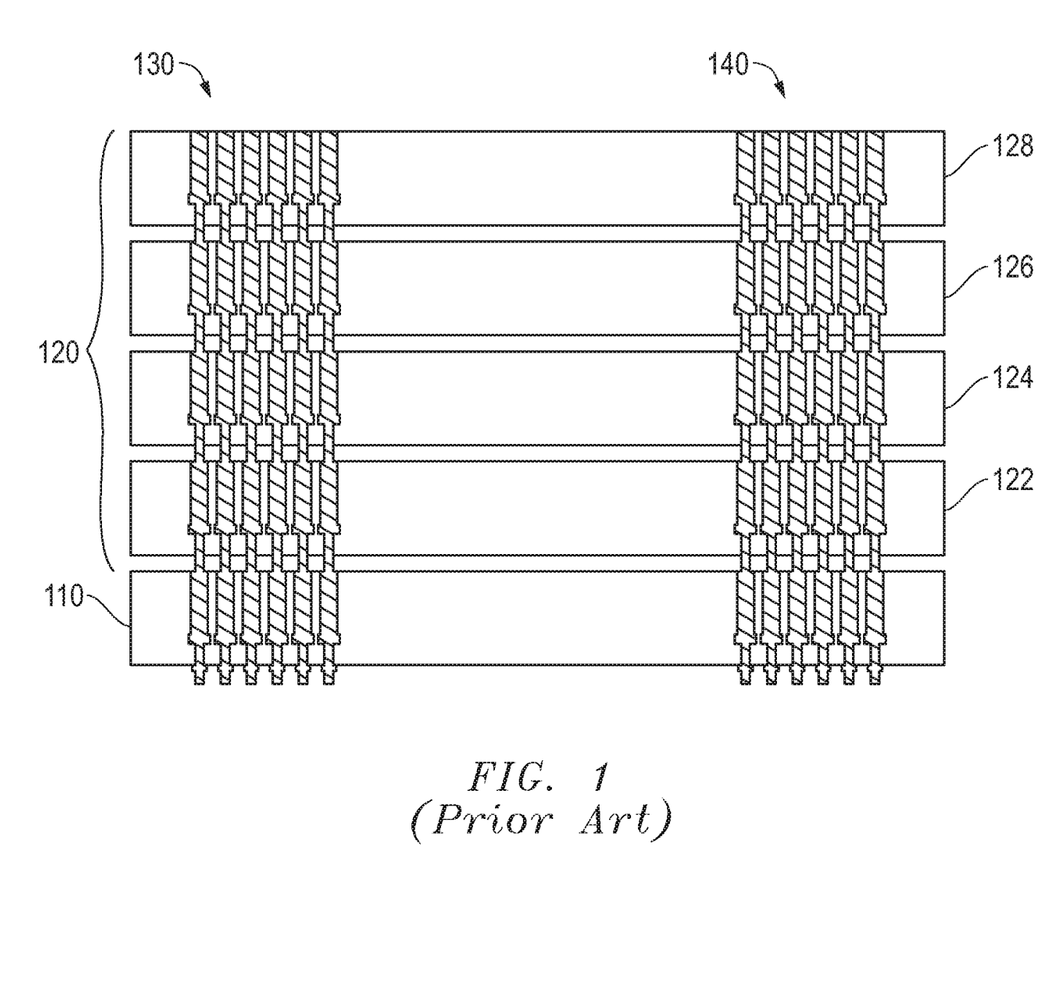
FIG. 1 illustrates a cross-section of a memory module known in the prior art.

FIG. 1 illustrates a cross-section of a memory module 100 known in the prior art. Memory module 100 is formed as an integrated circuit die stack that includes an optional base die 110 and a set of bulk memory dies 120. Bulk memory dies 120 include dynamic random access memory (DRAM) dies 122, 124, 126, and 128 physically overlying optional base die 110 and connected to it using die-to-die bonding technology. The die-to-die bonding technology includes hybrid bonding, thermo-compression bonding, micro-bumping, die-to-wafer bonding, wafer-to-wafer bonding, and the like. With hybrid bonding technology, the circuitry formed in (for bulk semiconductor technologies) or on (for epitaxial deposition technologies) the semiconductor substrate is connected from the active surface to the opposite surface using through-silicon vias (TSVs). Using this technique, a landing pad on the active surface of a subsequent die in the die stack is electrically and mechanically connected to a corresponding TSV of a previous die. Die-to-die bonding provides low resistance inter-die interconnects and is shown graphically in FIG. 1 as memory channels 130 and 140.

Figure 2:
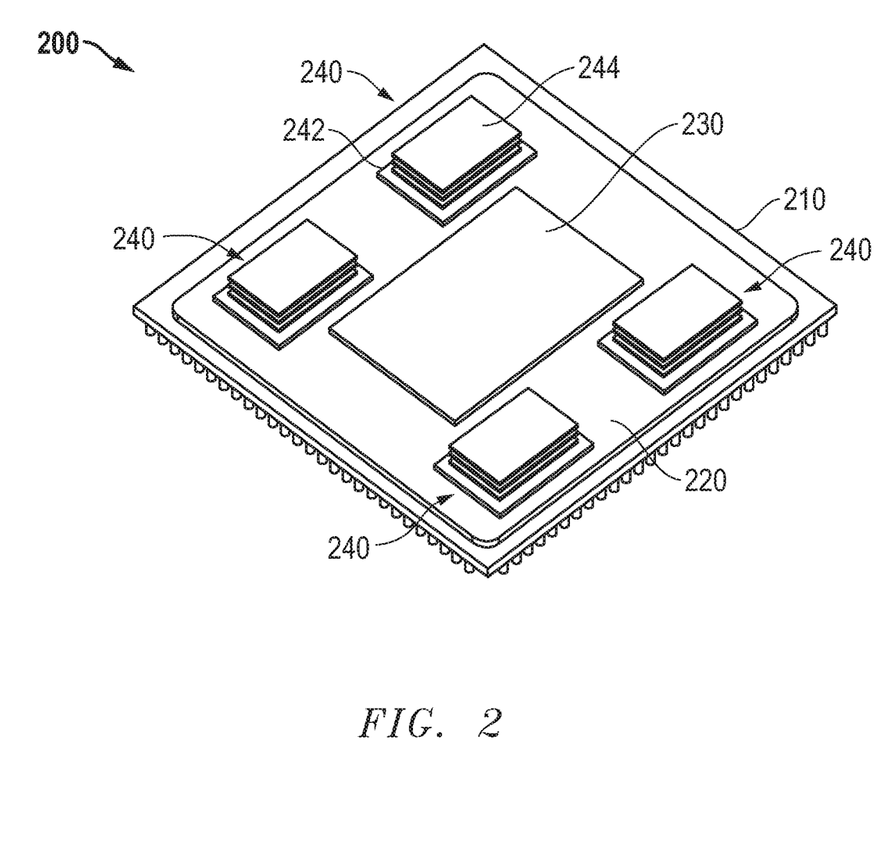
FIG. 2 is a perspective view of an integrated circuit with multiple memory modules.

FIG. 2 is a perspective view of an integrated circuit 200 with multiple memory modules. As shown in FIG. 2, integrated circuit 200 includes a package substrate 210, a printed circuit board or interconnect substrate 220, a host processor 230, and a set of four memory modules 240 each implemented as an integrated circuit die stack that includes a base die 242 with a set of vertically stacked memory dies 244. In one exemplary embodiment, memory modules 240 use high bandwidth memory (HBM) that is well adapted for vertical stacking because of its use of TSV technology, allowing integrated circuit 200 to occupy a relatively small amount of planar area and a relatively small amount of volume. The base die in each memory module 240 can include a controller, a processor-in-memory (PIM), or the like. In one example, each memory module 240 has a base die and a four-die memory stack associated with it.

Figure 3:
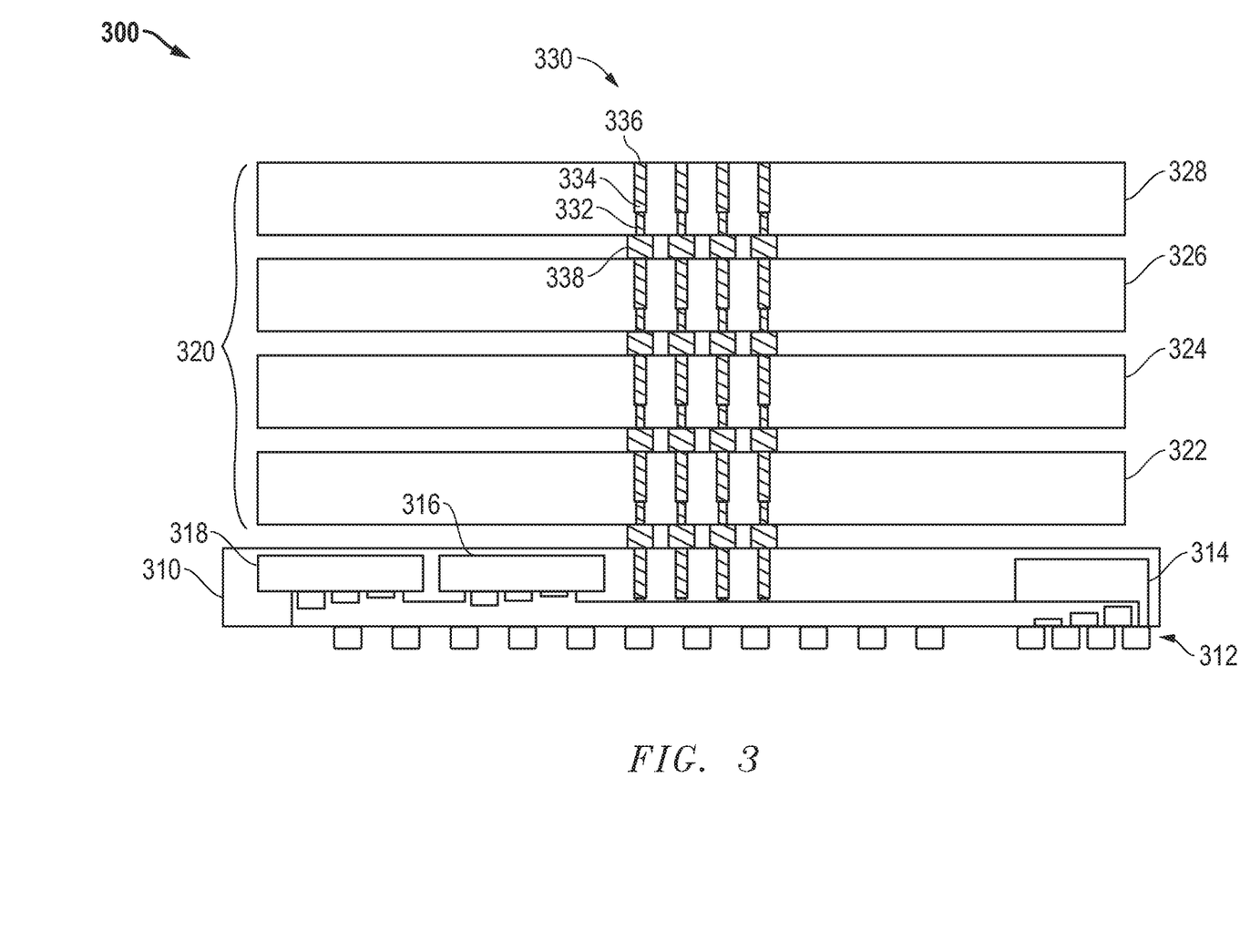
FIG. 3 illustrates a cross-section of a memory module according to some embodiments.

FIG. 3 illustrates a cross-section of a memory module 300 according to some embodiments. Memory module 300 is formed as an integrated circuit die stack that includes a base die 310 and a set of bulk memory dies 320 forming a bulk memory. In the exemplary embodiment, bulk memory dies 320 include HBM DRAM dies physically overlying base die 310 and connected to it over a memory channel 330 using die-to-die bonding technology. The die-to-die bonding technology can include hybrid bonding, thermo-compression bonding, micro-bumping, die-to-wafer bonding, wafer-to-wafer bonding, and the like.

More specifically base die 310 includes an external interface 312 with a set of microbumps, a physical interface circuit (PHY) 314, a memory module scratchpad (MMS) 316, and a processor-in-memory (PIM) 318. PHY 314, MMS 316, and PIM 318 are connected together and to the microbumps on external interface 312 and to memory channel 330 using conventional semiconductor metal layer routing.

With hybrid bonding technology, the circuitry formed in (for bulk semiconductor technologies) or on (for epitaxial deposition technologies) the semiconductor substrate is connected from the active surface to the opposite surface using TSVs. Using this technique, a landing pad on the active surface of a subsequent die in the die stack is electrically and mechanically connected to the TSV of a previous die. Memory channel 330 includes a set of conductors each having a metal interconnect segment 332, a TSV 334, a TSV top surface 336, and a hybrid bond 338. Metal interconnect segment 332 extends from a TSV landing pad on the active surface to a bottom end of a corresponding TSV 334. TSV top surface 336 is connected to a subsequent landing pad through a corresponding hybrid bond. Hybrid bond 338 is shown as a discrete element but using hybrid bonding technology it actually corresponds to intermetallics formed by bonding TSV top surface 336 to a corresponding hybrid bond landing pad on a subsequent die, and the surfaces of adjacent die in the die stack are substantially flush against each other.

Because of the physical proximity and low interconnect resistance, signals are able to travel through memory channel 330 fast and without significant skew due to relatively small loading, and MMS 316 provides lower access overhead than the bulk memory. First, accessing MMS 316 reduces overhead required for certain high-overhead accesses to bulk memory such as DRAM and non-volatile memory. For example, DRAM requires overhead cycles for row activations before the data can be accessed when the accessed data is not stored in an open row. Second, MMS 316 reduces the latency of accesses to data elements stored in MMS 316 so that the memory accessing agent is able to retrieve the data faster. For example, data that is about to be used by a memory accessing agent can be pre-stored in MMS 316 to improve the processing performance. Third, PIM 318 is able to access data in MMS 316 faster than it can access data in bulk memory dies 320 for its own computations because it is co-located with MMS 316 on the same base die 310 and signal routing paths are shorter. Fourth, using PIM 318 to process data stored in MMS 316 avoids the overhead of data movement through the internal busses and cache hierarchy of host integrated circuit 230.

Figure 4:
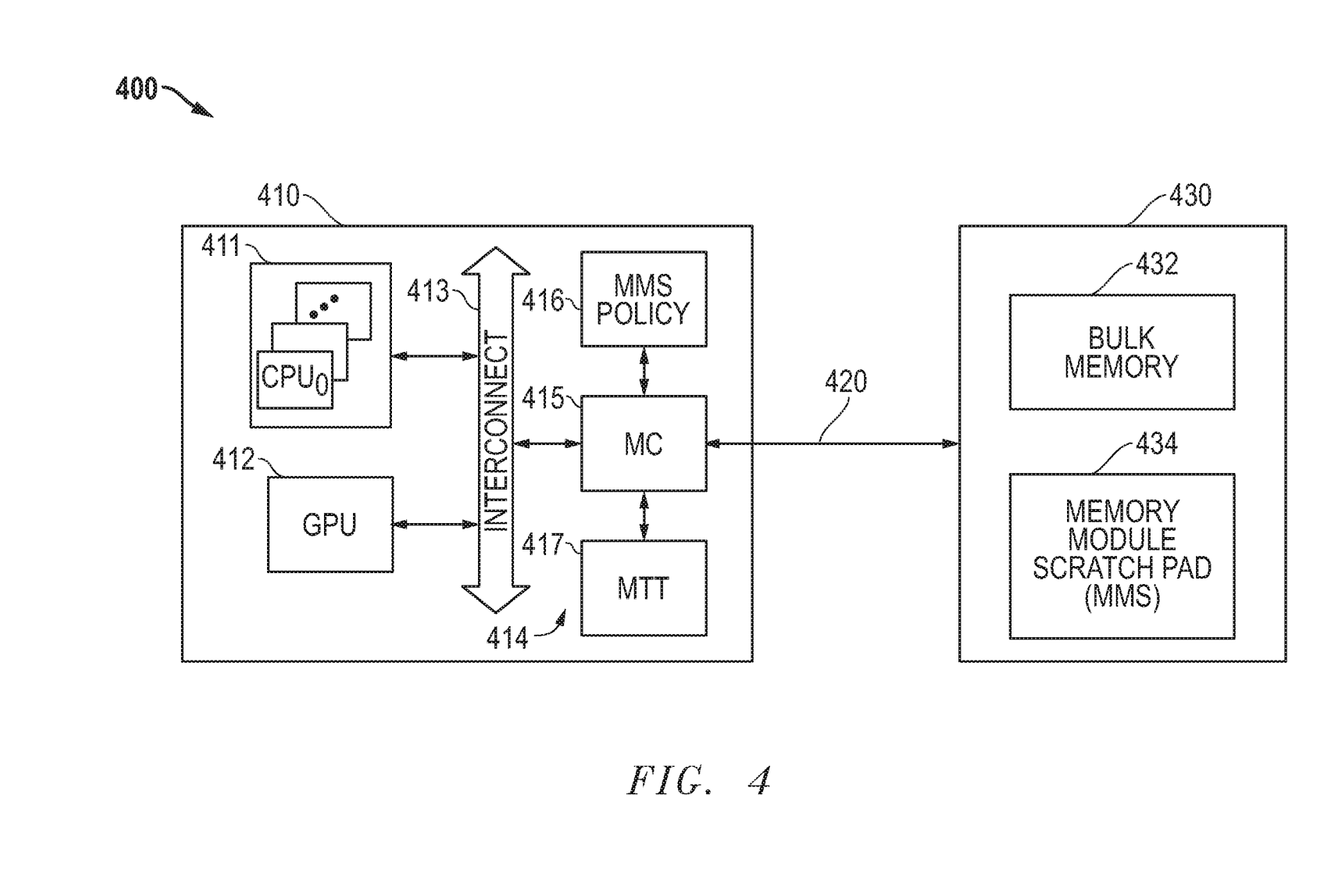
FIG. 4 illustrates in block diagram form a data processing system with a memory module having a memory module scratchpad (MMS) according to some embodiments.

FIG. 4 illustrates in block diagram form a data processing system 400 with a host integrated circuit 410, a memory bus 420, and a memory module 430. Host integrated circuit 410 is an accelerated processing unit (APU) and includes a set of central processing unit (CPU) cores 411, a graphics processing unit (GPU) 412, an interconnect 413, and a memory access circuit 414. CPU cores 411 include an exemplary set of CPU cores including a CPU core labeled "$CPU_0$". Interconnect 413 is bidirectionally connected to each of CPU cores 411, GPU 412, and memory controller 415 for communicating address, data, and control signals. Memory access circuit 414 includes a memory controller 415, a memory module scratchpad policy circuit 416, and a memory module scratchpad tracking table (MTT) 417. Memory controller 415 has a first port connected to interconnect 413, a second port connected to memory bus 420, a third port bidirectionally connected to MMS policy circuit 416, and a fourth port bidirectionally connected to MTT 417. Memory module 430 includes a bulk memory 432 and an MMS 434. MMS 434 is part of a base die of the memory module, which in various other embodiments has other circuits such as PHY 314 and PIM 318 as shown in FIG. 3.

CPUs cores 411 perform conventional data processing operations and generate data accesses in response to stored program instructions. GPU 412 performs conventional graphics or compute processing operations including vertex processing, shading, and rendering, and utilizes the same memory space as part of a unified memory architecture. Thus both CPU cores 411 and GPU 412 operate as memory accessing agents that generate memory accesses of memory module 430. Memory controller 415 intelligently schedules the memory access requests received from CPU cores 411 and GPU 412 according to policies that balance efficiency and fairness, and interleave memory refresh cycles to prevent the loss of data in DRAM.

In order to make use of MMS 434, memory access circuit 414 also includes MMS policy circuit 416 and MTT 417. MMS policy circuit 416 selectively makes data movement decisions and in response causes memory controller 415 to copy data at certain addresses between bulk memory 432 and MMS 434. In one example, MMS policy circuit 416 makes a data movement decision in response to an instruction from a memory accessing agent. The instruction can be, for example, an explicit prefetch instruction. The instruction can also be a data processing instruction with a prefetch hint. In another example, MMS policy circuit 416 can make the data movement decision in response to detecting an access pattern of a set of memory access requests by one or more memory accessing agents. In this example, MMS policy circuit 416 examines the pattern of operations received from CPU cores 411 and/or GPU 412 to intelligently detect memory locations that are frequently accessed or are likely to be accessed in the future.

MTT 417 maintains a table of the data that has been copied from bulk memory 432 to MMS 434, i.e. the addresses that are currently mapped to MMS 434. In some embodiments, MTT further stores metadata related to the operations that have been performed while the addresses have been mapped in MMS 434. For example, when an address is to be removed from MMS 434, information about whether the data at that address has been modified can be used by memory controller 415 to determine whether it needs to be copied back to bulk memory 432 or the address can be removed from MTT 417 without copying it back.

By placing control of MMS 434 in host integrated circuit 410, data processing system 400 allows the use of standard memory dies for bulk memory 432 and the simplification of the design of MMS 434 in memory module 430. This architecture also allows customization of MMS management policy based on the nature and function of the host integrated circuit 410 without the need to customize memory module 430 and avoids the replication of control circuitry in each base die when the integrated circuit uses multiple die stacks such as integrated circuit 200 of FIG. 2.

Figure 5:
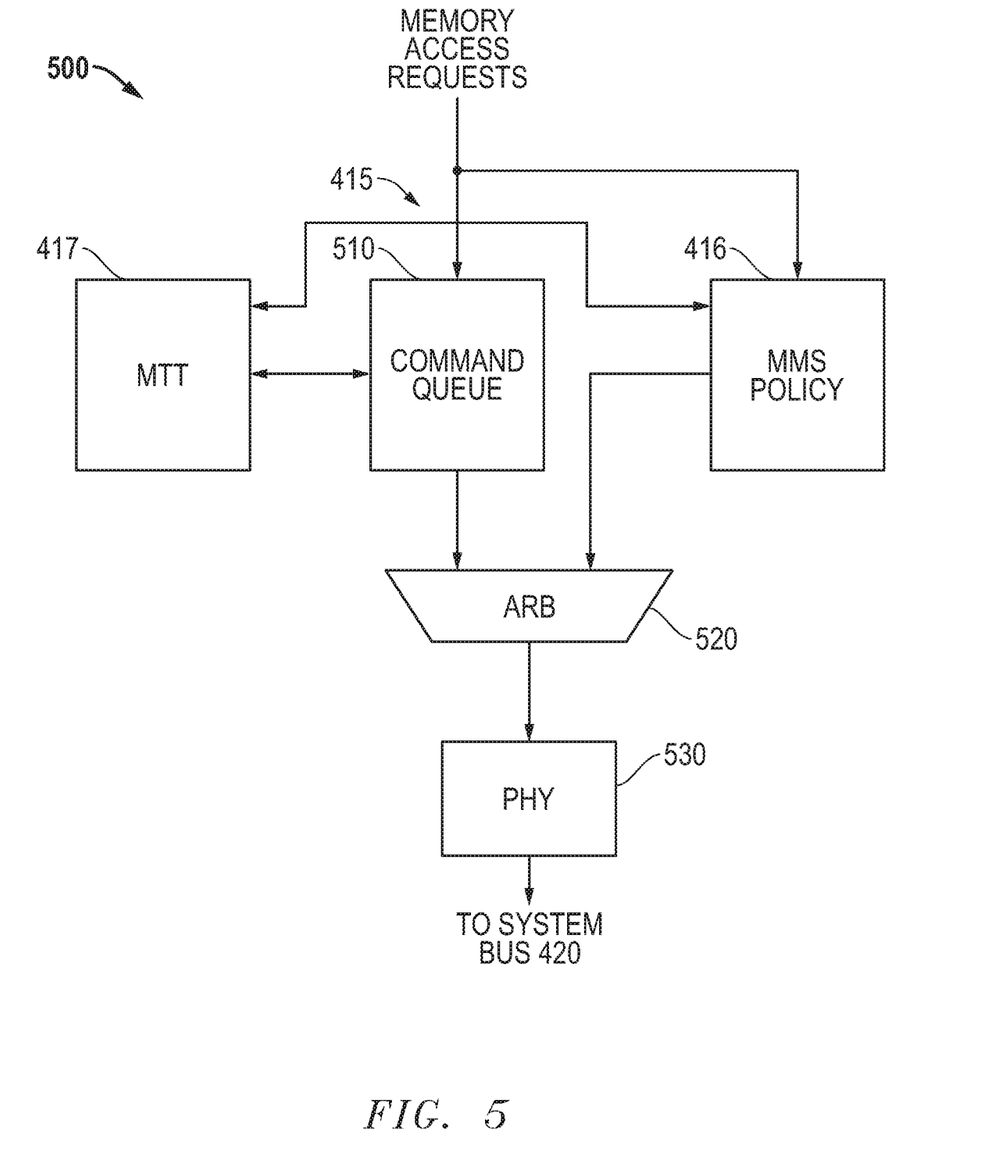
FIG. 5 illustrates in block diagram form a memory access circuit that can be used to implement the memory access operations of the data processing system of FIG. 4.

FIG. 5 illustrates in block diagram form a memory access circuit 500 that can be used to implement the memory access operations of data processing system 400 of FIG. 4. Memory access circuit 500 includes memory controller 415, MMS policy circuit 416, and MTT 417 as previously shown in FIG. 4. In memory access circuit 500, memory controller 415 more specifically includes a command queue 510, an arbiter 520, and a physical interface (PHY) 530. Command queue 510 has an input for receiving memory access requests from a memory accessing agent (for example any of CPU cores 411 and GPU 412), an output, and a bidirectional control interface connected to MTT 417. Arbiter 520 has an input connected to the output of command queue 510, a second input, and an output. PHY 530 has an input connected to the output of arbiter 520, and an output connected to memory bus 420. MMS policy block 416 has a bidirectional control port, and an output connected to the second input of arbiter 520. MTT has a first bidirectional port connected to the bidirectional control port of command queue 510, and a second bidirectional port connected to the bidirectional control port of MMS policy circuit 416.

Command queue 510 is a queue of memory access requests received from the memory accessing agents, such as CPU cores 411 and GPU 412. Command queue 510 stores decoded address fields as well other address information that allows arbiter 520 to select memory accesses efficiently.

Arbiter 520 improves efficiency by intelligent scheduling of accesses to improve the usage of memory bus 420. Arbiter 520 enforces timing eligibility and schedules accesses based on access type (such as read or write), quality of service, page status of the accessed page compared to the active page in the accessed memory bank (e.g. one of page hit, page miss, or page conflict), and fairness rules.

PHY 530 converts the access requests into physical signals provided over memory bus 420. These signals are defined by a standard related to the bulk memory device. For example if the bulk memory device is DRAM, a standard such as JESD-235A promulgated by the Joint Electron Devices Engineering Council (JEDEC) related to high bandwidth memory defines the relevant signals.

Memory controller 415 arbitrates between normal read and write memory access requests stored in command queue 510 and data movement operations generated in response to data movement decisions made by MMS policy circuit 416. Thus it helps maintain system efficiency by scheduling the data movement operations when they won't disrupt normal memory access operations. Also arbiter 520 can enforce other policies with respect to data that is stored in MMS 434, such as prioritizing accesses to MMS 434 over accesses to bulk memory 432.

Figure 6:
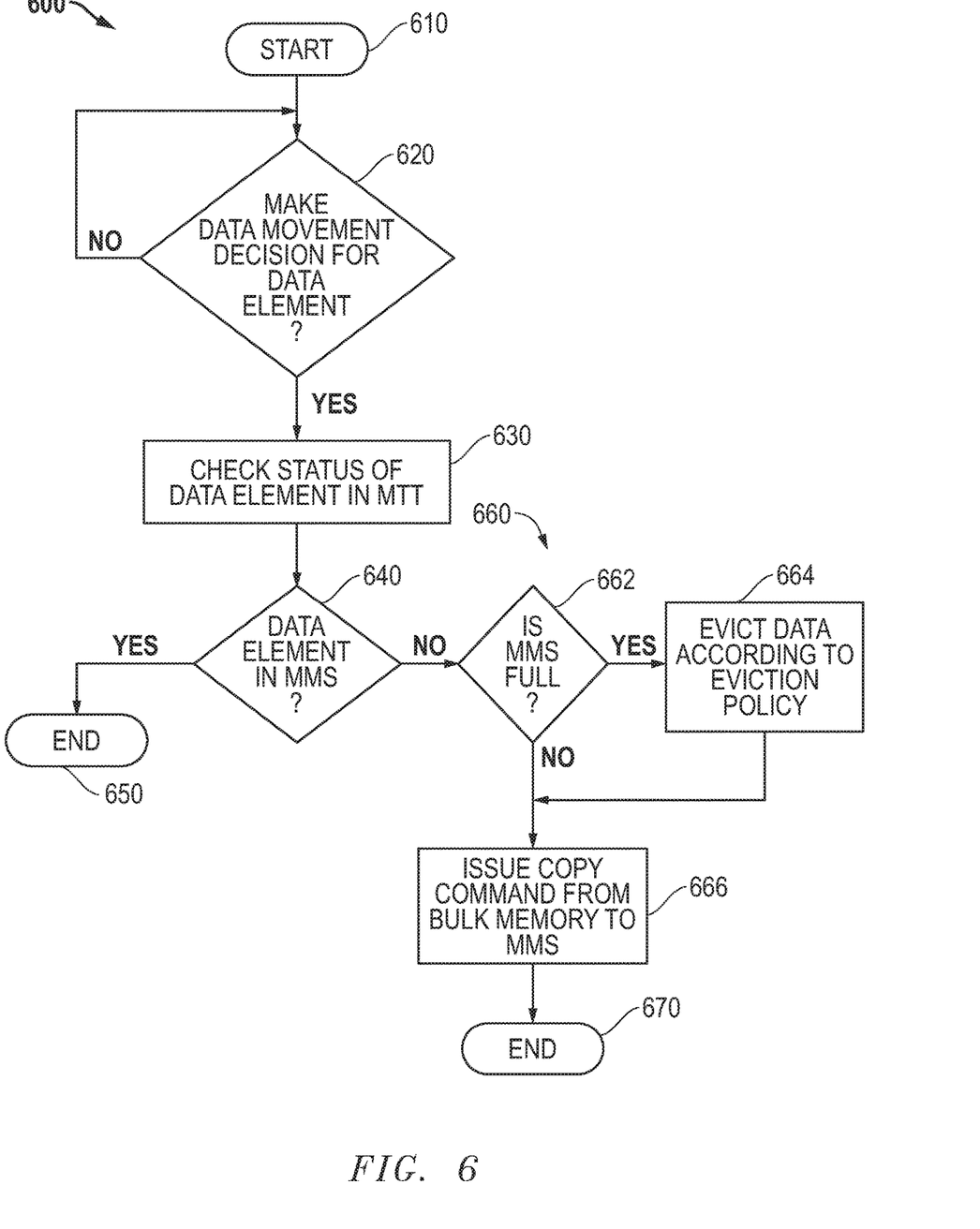
FIG. 6 illustrates a flow chart showing the flow of the MMS policy circuit of FIGS. 4 and 5 during a data movement operation.

FIG. 6 illustrates a flow chart 600 showing the flow of MMS policy circuit 416 of FIGS. 4 and 5 during a data movement operation. Flow starts at a box 610. At a decision box 620, MMS policy circuit 416 determines whether to make a data movement decision for a data element. As described above, MMS policy circuit 416 can make the data movement decision using a variety of criteria, including receiving an explicit prefetch instruction, receiving a prefetch hint from a data processing instruction, autonomously detecting a data accessing pattern in normal reads and writes, and the like. If none of the supported conditions are met, then flow returns to decision box 620. However if MMS policy circuit 416 makes a data movement decision, then flow proceeds to an action box 630. At action box 630, MMS policy circuit 416 detects the status of the address for the particular data element in MTT 417. For example, the address of the data element may already have been copied into MMS 434 when MMS policy circuit 416 makes a separate data movement decision that impacts the data element. Thus at a decision box 640, MMS policy circuit 416 detects whether the data element is already in MMS 434. If so then the flow ends at a box 650. If not, then flow proceeds to a copy to MMS sub-flow 660. In a decision box 662, MMS policy circuit 416 determines whether MMS 434 is full. If MMS 434 is full, then flow proceeds to an action box 664, at which the MMS policy circuit 416 evicts data from MMS 434 according to an eviction policy to make room for the data element. MMS policy circuit 416 re-assigns the data element to bulk memory 423, and copies any modified data back to bulk memory 423. Then flow proceeds to an action box 666, at which MMS policy circuit 416 issues a copy command to assign the address of the data element to MMS 434 and to copy the data from bulk memory 423 to MMS 434. If MMS 434 is not full, then flow proceeds directly to action box 666. MMS policy circuit 416 issues the copy command to arbiter 520, and when dispatched sends the update of the memory map to MTT 417 and the flow ends at a box 670. Note that if it autonomously detects memory access patterns, MMS policy circuit 416 may include multiple counters and timers to detect multiple interleaved memory access patterns.

Figure 7:
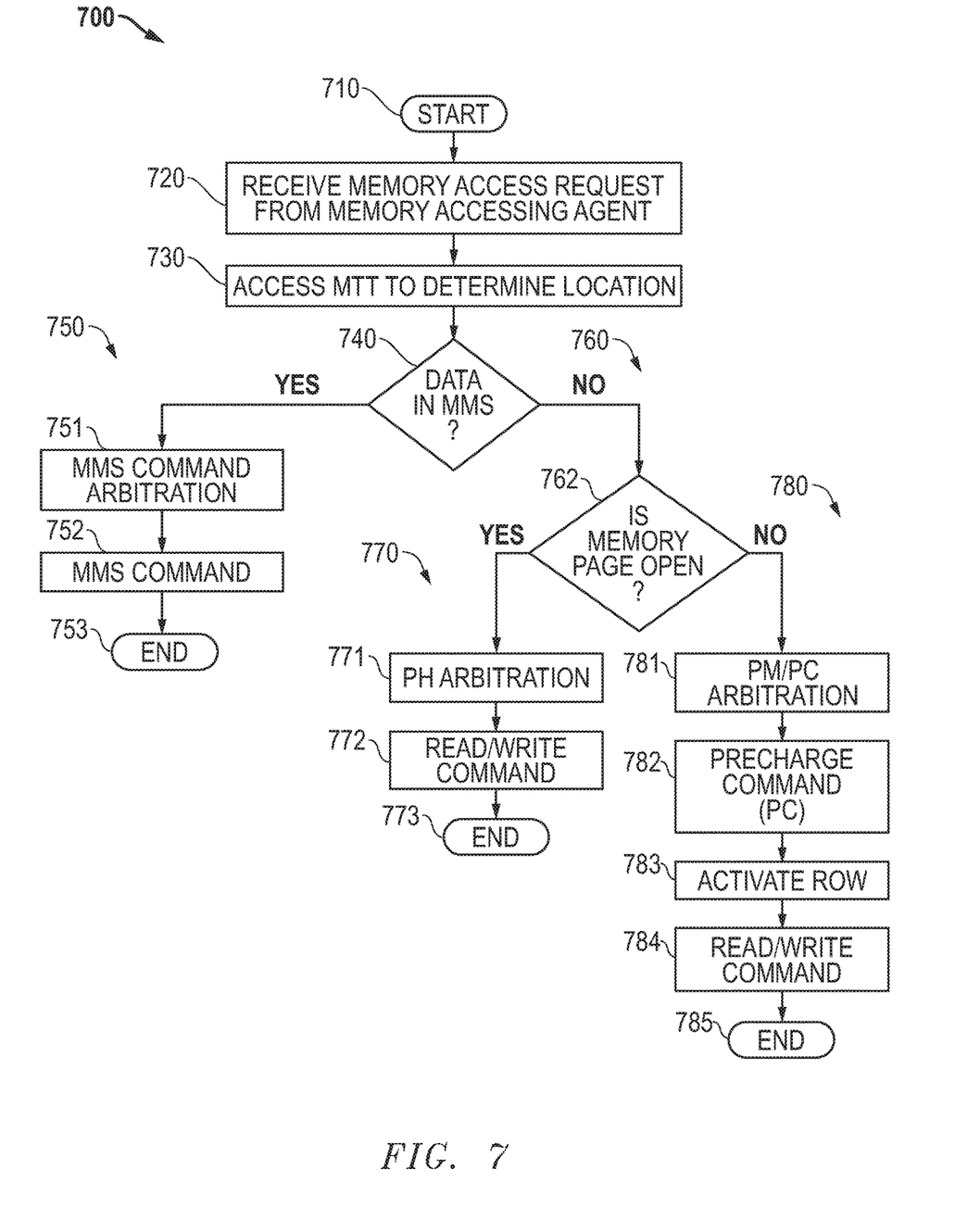
FIG. 7 illustrates a flow chart showing a data access operation of the memory controller of FIGS. 4 and 5.

FIG. 7 illustrates a flow chart 700 showing a data access operation of memory controller 415 of FIGS. 4 and 5. Flow begins at a box 710. At an action box 720, memory controller 415 receives a memory access request from a memory accessing agent, such as CPU cores 411 and GPU 412. At an action box 730, memory controller 415 accesses MTT 417 to determine the location of the accessed data. At a decision box 740, memory controller 415 determines whether the address is mapped to MMS 434 and thus the data is stored in MMS 434.

If so, then flow proceeds to a sub-flow 750. At an action box 751, arbiter 520 performs arbitration between the data copy commands provided by MMS policy circuit 416 and other commands. The arbitration can be a simple arbitration, e.g. one in which the MMS command is always prioritized over other commands, or in which the MMS command waits until its overhead can be hidden or partially hidden among other accesses on the memory channel. At an action box 752, memory controller 415 selects the MMS command, and the flow ends at an action box 753.

If not, then flow proceeds to a sub-flow 760 in which memory controller 415 performs normal command arbitration. At a decision box 762, arbiter 520 determines whether the accessed memory page of a command is open. If so, then flow proceeds to a sub-flow 770, and arbiter 520 performs page hit arbitration at a decision box 772. When the command is timing eligible and meets other criteria, such as being the oldest page hit command, then arbiter 520 selects the read or write command and provides it to PHY 530, and PHY 530 completes the command, and the flow ends at a box 773. In either case, MMS policy circuit 416 optionally also causes the data to be moved to MMS 434.

If not, then flow proceeds to a sub-flow 780. In sub-flow 780, arbiter 520 performs page hit and/or page conflict arbitration at an action box 781. In some embodiments, arbiter 520 treats page hits and page conflicts separately and arbitrates further among accesses in each category. In other embodiments, arbiter 520 treats page hits and page conflicts equally and selects among both types of accesses, optionally performing a precharge operation for a page conflict at an action box 782. In either case, the access does not result in a page hit, and so at an action box 783, arbiter 520 first activates the selected row.

Arbiter 520 also performs arbitration between the data copy command provided by MMS policy circuit 416 and other commands. The arbitration can be a simple arbitration, e.g. one in which an MMS command is always prioritized over other commands, or one in which the MMS command waits until its overhead can be hidden or partially hidden among other accesses on the memory channel. At an action box 784, arbiter 520 selects a read or write command and provides it to PHY 530, PHY 530 completes the command, and the flow ends at a box 785.

From this brief description it should be clear that there are many implementation choices for arbitration depending on the simplicity or performance required by the memory controller in the particular data processing system. Thus flow chart 700 merely provides an exemplary implementation of arbiter 520 in systems with MMS 434.

In addition to performing normal data accesses (i.e. reads and writes) from bulk memory 432 and MMS 434, memory controller 415 provides explicit commands to memory module 430 over memory bus 420 to copy data between bulk memory 432 and MMS 434. In one example, a single instruction includes source and destination addresses and indicates the direction of transfer based on the source and destination addresses. This command allows data to be copied within MMS 434, and modified data can be copied from MMS 434 to bulk memory 432 during an eviction operation. In another example, memory controller 415 can issue different commands to indicate different directions of data movement such as bulk memory 432 to MMS 434, MMS 434 to bulk memory 432, or one place in MMS 434 to another place in MMS 434. In yet another example, an instruction specifies a source address while the destination address is implicitly determined by, e.g., direct mapping or a hashing function.

Memory controller 415 can also use various mechanisms to directly access data that is already allocated to MMS 434. In one example, the command specifies the address in MMS 434 and the size and direction of transfer. In an alternative example, two different commands can be used for accesses performed within MMS 434, one for read and one for write.

Memory controller 415 can support various commands for operations to be performed by a PIM. While the types of operations supported by a PIM vary widely between applications, memory controller 415 can issue commands that specify the type of operations performed by the PIM and the location data (either bulk memory 432 or MMS 434) and pass data to the PIM.

Finally, memory controller 415 can perform query commands by which software or firmware running on the host integrated circuit 310 determines the characteristics of memory module 430. For example, a query command can query the memory module to determine the presence and characteristics of MMS 434. In this case, memory module 430 returns a vector of its capabilities and characteristics.

From this brief description of several embodiments of commands that memory controller 415 can provide, it should be apparent that a large variety and format of commands are possible to utilize the capabilities of a memory module with both bulk memory 432 and memory module scratchpad 434.

Thus, the data processing system, memory module, and memory controller disclosed herein provide improved operation of a computer system itself by selectively moving data between a relatively slow bulk memory and a faster memory module scratchpad. By accessing certain data from the faster memory module scratchpad, the bandwidth of the memory bus can be better utilized. The memory module scratchpad is not an associative cache, and there are no coherency or snooping operations that reduce the efficiency of the system. Moreover there are a variety of mechanisms that can be used to make decisions about which addresses should be mapped to the memory module scratchpad and which should remain mapped to bulk memory. The lower overhead is realized especially well in systems that use a processor-in-memory to operate on data that resides in the memory module scratchpad and lowers overhead both from the use of the memory bus and from overhead cycles for accessing common types of bulk memory like DRAM and non-volatile memory. While a memory system with a single memory channel has been shown, it should be apparent that the data processing system can support multiple memory channels with the same or different characteristics and capabilities.

Data processing system 400 or any portions thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which synthesizes the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the memory system could include DRAM for bulk memory 432, and SRAM for MMS 434. In another example, the memory system could include non-volatile memory, e.g. flash memory, for bulk memory 432, and DRAM for MMS 434. Other combinations of bulk memory and scratchpad memory are also possible. Moreover MMS policy circuit 416 can make data movement decisions between bulk memory 432 and MMS 434 using a variety of criteria, including a prefetch instruction, a data processing instruction with a prefetch hint, and an autonomous decision based on observing a memory accessing pattern. The host integrated circuit could include a variety of memory accessing agents or combinations of memory accessing agents including an APU, a CPU, a GPU, a digital signal processor (DSP), a digital logic circuit implemented using a field programmable gate array (FPGA) or as an application specific integrated circuit (ASIC), or any other type of digital logic circuit that accesses memory via a memory controller.

Accordingly, it is intended by the appended claims to cover all modifications of the disclosed embodiments that fall within the scope of the disclosed embodiments.

What is claimed is:

1. A data processing system comprising:
   a host integrated circuit having a memory controller and a memory module scratchpad policy circuit coupled to said memory controller for generating a data movement decision in response to detecting a memory accessing pattern of a set of memory access requests by one or more memory accessing agents;
   a memory bus coupled to said memory controller; and
   a memory module comprising a bulk memory and a memory module scratchpad coupled to said bulk memory, wherein said memory module scratchpad has a lower access overhead than said bulk memory,
   wherein said memory module scratchpad policy circuit causes said memory controller to selectively provide predetermined commands over said memory bus to cause said memory module to copy data between said bulk memory and said memory module scratchpad without conducting said data on said memory bus in response to said data movement decision,
   wherein in response to a subsequent memory access request, said memory controller accesses said memory module scratchpad to access said data instead of said bulk memory.

2. The data processing system of claim 1, wherein said memory module further comprises:
   a processor-in-memory coupled to and formed on the same die as said memory module scratchpad for performing data accesses with data in said bulk memory and said memory module scratchpad.

3. The data processing system of claim 1, wherein:
   said bulk memory comprises dynamic random access memory; and
   said memory module scratchpad comprises static random access memory.

4. The data processing system of claim 1, wherein:
   said bulk memory comprises non-volatile memory; and
   said memory module scratchpad comprises dynamic random access memory.

5. The data processing system of claim 1, wherein:
   said memory module scratchpad policy circuit generates a second data movement decision in response to an instruction executed by a memory accessing agent.

6. The data processing system of claim 5, wherein:
   said instruction comprises a prefetch instruction.

7. The data processing system of claim 5, wherein:
   said instruction comprises a data processing instruction with a prefetch hint.

8. The data processing system of claim 1, wherein said memory controller comprises:
   a command queue for storing instructions generated by a memory accessing agent; and
   an arbiter for selecting instructions from either said command queue or from said memory module scratchpad policy circuit based on predetermined criteria.

9. The data processing system of claim 8, wherein said host integrated circuit further comprises:
   a memory module scratchpad tracking table coupled to said memory controller for identifying which data has been copied to said memory module scratchpad.

10. The data processing system of claim 9 wherein:
    said memory module scratchpad tracking table further stores metadata related to said data which has been copied to said memory module scratchpad.

11. A data processing system having a host integrated circuit, the host integrated circuit comprising:
    a memory accessing agent for generating memory access requests;
    a memory controller coupled to said memory accessing agent and having an interface for connection to a memory bus, wherein in response to a memory access request from said memory accessing agent, said memory controller provides one of a first set of commands for accessing data selectively from one of a bulk memory and a memory module scratchpad coupled to said bulk memory, and in response to a data movement decision, said memory controller provides one of a second set of commands for transferring data between said bulk memory and said memory module scratchpad without conducting said data on said memory bus, wherein said first set of commands is different from said second set of commands, and in response to a subsequent memory access request to said data, said memory controller provides one of said first set of commands to conduct said data over said memory bus; and
    a memory module scratchpad policy circuit coupled to said memory accessing agent and to said memory controller for generating said data movement decision in response to detecting a memory accessing pattern of a set of memory access requests by one or more memory accessing agents.

12. The data processing system of claim 11 wherein in response to a first memory access request from said memory accessing agent:
    said memory controller determines whether a data element is in said memory module scratchpad;
    if said data element is in said memory module scratchpad, said memory controller accesses said data in said memory module scratchpad; and
    if said data element is not in said memory module scratchpad, said memory controller accesses said data element in said bulk memory.

13. The data processing system of claim 12, wherein said host integrated circuit further comprises:
a memory module scratchpad tracking table coupled to said memory controller for identifying which data has been copied to said memory module scratchpad.

14. The data processing system of claim 12, wherein:
if said data element is not in said memory module scratchpad, said memory controller selectively causes said data element to be copied from said bulk memory to said memory module scratchpad.

15. The data processing system of claim 11, wherein:
said memory module scratchpad policy circuit generates a second data movement decision in response to an instruction executed by said memory accessing agent.

16. The data processing system of claim 15, wherein:
said instruction comprises a prefetch instruction.

17. The data processing system of claim 16, wherein:
said instruction comprises a data processing instruction with a prefetch hint.

18. The data processing system of claim 11, wherein said memory controller comprises:
a command queue for storing instructions generated by said memory accessing agent; and
an arbiter for selecting instructions from either said command queue or from said memory module scratchpad policy circuit based on predetermined criteria.

19. The data processing system of claim 13, wherein:
said memory module scratchpad tracking table further stores metadata related to said data which has been copied to said memory module scratchpad.

20. A data processing system comprising a memory module, the memory module comprising:
a base die having an external interface and a memory module scratchpad coupled to said external interface;
a plurality of bulk memory dies; and
a memory channel coupled to said base die and to each of said plurality of bulk memory dies,
wherein in response to a first predetermined command, said base die conducts data between said external interface and a selected one of said plurality of bulk memory dies and said memory module scratchpad, and in response to a second predetermined command, the memory module copies data between at least one of said plurality of bulk memory dies and said memory module scratchpad over said memory channel without conducting said data on said memory bus, and
wherein said base die further has a processor-in-memory coupled to said memory module scratchpad that performs data accesses with data in at least one of said bulk memory dies and said memory module scratchpad using said first predetermined command and that operates on data that resides in said memory module scratchpad.

21. The memory module of claim 20, wherein:
said base die and said plurality of bulk memory dies are combined in a vertical die stack using die-to-die bonding.

22. The memory module of claim 20, wherein:
in response to said first predetermined command, if said data is not stored in said memory module scratchpad, the memory module provides said data to said external interface while storing said data in said memory module scratchpad.

23. The memory module of claim 20, wherein:
each of said plurality of bulk memory dies comprises dynamic random access memory; and
said memory module scratchpad comprises static random access memory.

24. The memory module of claim 20, wherein:
each of said plurality of bulk memory dies comprises non-volatile memory; and
said memory module scratchpad comprises dynamic random access memory.

25. A method for use in a data processing system having a host integrated circuit, a memory bus, and a memory module coupled to the host integrated circuit over the memory bus and having a bulk memory, the method comprising:
coupling a memory module scratchpad to the bulk memory in the memory module;
selectively making a data movement decision by the host integrated circuit for a data element in the memory module;
issuing a copy command to the memory module over the memory bus to copy said data element between the bulk memory and the memory module scratchpad without conducting said data element on said memory bus in response to making said data movement decision; and
accessing said data element in said memory module scratchpad in response to a subsequent memory access request,
wherein said selectively making said data movement decision comprises generating said data movement decision in response to detecting a memory accessing pattern of a set of memory access requests by one or more memory accessing agents.

26. The method of claim 25, further comprising:
checking a status of said data element to determine if said data element is stored in said memory module scratchpad; and
selectively issuing said copy command in response to said checking.

27. The method of claim 25, wherein said selectively making said data movement decision further comprises:
generating a second data movement decision in response to at least one instruction executed by a memory accessing agent of the host integrated circuit.

28. The method of claim 27, wherein said selectively making said second data movement decision further comprises:
generating said data movement decision in response to a prefetch instruction.

29. The method of claim 25, wherein said selectively making said data movement decision further comprises:
generating a second data movement decision in response to a data processing instruction with a prefetch hint.

30. The method of claim 25, wherein the method further comprises:
before issuing said copy command to the memory module, determining whether the memory module scratchpad is full; and
if said memory module scratchpad is full, evicting data from said memory module scratchpad based on an eviction policy.

31. A method for use in a data processing system having a host integrated circuit, a memory bus, and a memory module coupled to said host integrated circuit over said memory bus and having a bulk memory, the method comprising:
coupling a memory module scratchpad to the bulk memory in the memory module;

making a data movement decision for a data element, including detecting a memory access pattern of a set of memory access requests by one or more memory accessing agents of said host integrated circuit;

copying said data element from said bulk memory to said memory module scratchpad without conducting said data element on said memory bus in response to said data movement decision;

storing an indication in a memory module scratchpad tracking table that said data element is in said memory module scratchpad;

receiving a subsequent memory access request;

accessing said memory module scratchpad tracking table to determine whether said memory module scratchpad stores data of said subsequent memory access request;

if said memory module scratchpad stores said data of said subsequent memory access request, issuing a first command to said memory module scratchpad to complete said subsequent memory access request; and if said memory module scratchpad does not store said data of said subsequent memory access request, issuing a second command to the bulk memory to complete said subsequent memory access request.

32. The method of claim 31, wherein said issuing said first command to said memory module scratchpad to complete said subsequent memory access request comprises:

arbitrating between said first command and other pending memory access requests in the host integrated circuit for access to the memory bus; and sending said first command to the memory module over the memory bus in response to a completion of said arbitrating.

33. The method of claim 31, wherein said issuing said second command to the bulk memory to complete said subsequent memory access request comprises:

arbitrating between said second command and other pending memory access requests in the host integrated circuit for access to the memory bus; and sending said second command to the memory module over the memory bus in response to a completion of said arbitrating.

34. The method of claim 33, wherein said arbitrating said issuing said second command to the bulk memory to complete said subsequent memory access request comprises:

arbitrating between said second command and other pending memory access requests in the host integrated circuit for access to the memory bus based on a page status of a page in the bulk memory being accessed.

* * * * *